United States Patent
Betouin et al.

(10) Patent No.: US 9,128,722 B2
(45) Date of Patent: ***Sep. 8, 2015

(54) SYSTEMS, METHODS, AND COMPUTER-READABLE MEDIA FOR FERTILIZING MACHINE-EXECUTABLE CODE

(71) Applicant: Apple Inc., Cupertino, CA (US)

(72) Inventors: Pierre Betouin, Boulogne (FR); Mathieu Ciet, Paris (FR); Augustin J. Farrugia, Los Altos Hills, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/851,581

(22) Filed: Mar. 27, 2013

(65) Prior Publication Data

US 2013/0232468 A1    Sep. 5, 2013

Related U.S. Application Data (63) Continuation of application No. 12/434,300, filed on May 1, 2009, now Pat. No. 8,434,059.

(51) Int. Cl.
*G06F 9/44* (2006.01)
*G06F 9/45* (2006.01)
*G06F 21/14* (2013.01)

(52) U.S. Cl.
CPC ........ *G06F 8/33* (2013.01); *G06F 8/423* (2013.01); *G06F 21/14* (2013.01)

(58) Field of Classification Search
CPC ............... G06F 8/20; G06F 8/33; G06F 8/38; G06F 8/71; G06F 17/24
See application file for complete search history.

(56) References Cited

U.S. PATENT DOCUMENTS

| | | |
|---|---|---|
| 6,964,036 B2 | 11/2005 | Bates |
| 7,386,833 B2 | 6/2008 | Granny et al. |
| 7,409,675 B2 | 8/2008 | Brumme et al. |
| 7,788,650 B2 * | 8/2010 | Johnson et al. ............... 717/140 |
| 7,810,080 B2 | 10/2010 | Plum et al. |
| 7,823,135 B2 | 10/2010 | Horning et al. |
| 8,136,102 B2 | 3/2012 | Papakipos et al. |
| 8,161,464 B2 | 4/2012 | Archambault |
| 8,166,450 B2 | 4/2012 | Fuhler et al. |
| 8,739,144 B2 * | 5/2014 | Stoicescu et al. ............. 717/155 |
| 2003/0088573 A1 * | 5/2003 | Stickler ......................... 707/100 |

(Continued)

*Primary Examiner* — Don Wong
*Assistant Examiner* — Mohammad Kabir
(74) *Attorney, Agent, or Firm* — Novak Druce Connolly Bove + Quigg LLP

(57) ABSTRACT

Disclosed herein are systems, computer-implemented methods, and non-transitory computer-readable storage media for obfuscating code, such as instructions and data structures. Also disclosed are non-transitory computer-readable media containing obfuscated code. In one aspect, a preprocessing tool (i.e. before compilation) identifies in a source program code a routine for replacement. The tool can be a software program running on a computer or an embedded device. The tool then selects a function equivalent to the identified routine from a pool of functions to replace the identified routine. A compiler can then compile computer instructions based on the source program code utilizing the selected function in place of the identified routine. In another aspect, the tool replaces data structures with fertilized data structures. These approaches can be applied to various portions of source program code based on various factors. A software developer can flexibly configure how and where to fertilize the source code.

19 Claims, 6 Drawing Sheets

(56) References Cited

U.S. PATENT DOCUMENTS

| | | | |
|---|---|---|---|
| 2005/0050046 A1* | 3/2005 | Puz et al. | 707/9 |
| 2008/0022265 A1* | 1/2008 | Morris | 717/140 |
| 2008/0162414 A1 | 7/2008 | Kirk et al. | |
| 2008/0279073 A1* | 11/2008 | Gotoh et al. | 369/53.17 |
| 2009/0113386 A1* | 4/2009 | Eker et al. | 717/108 |
| 2009/0158249 A1* | 6/2009 | Tomkins et al. | 717/107 |
| 2009/0183137 A1 | 7/2009 | Ponnath | |
| 2010/0262839 A1 | 10/2010 | Eker et al. | |
| 2012/0030165 A1 | 2/2012 | Guirguis et al. | |

* cited by examiner

SYSTEMS, METHODS, AND COMPUTER-READABLE MEDIA FOR FERTILIZING MACHINE-EXECUTABLE CODE

CROSS-REFERENCE TO RELATED APPLICATIONS

This application is a continuation of U.S. patent application Ser. No. 12/434,300, filed on May 1, 2009, entitled "SYSTEMS, METHODS, AND COMPUTER-READABLE MEDIA FOR FERTILIZING MACHINE-EXECUTABLE CODE", which is incorporated by reference in its entirety, for all purposes, herein.

BACKGROUND OF THE INVENTION

1. Field of the Invention

The present invention relates to code obfuscation and more specifically to obfuscating portions of machine-executable code by replacing them with functionally equivalent variations.

2. Introduction

Software publishers often attempt to restrict access to portions of compiled software executables to thwart would-be reverse engineering while still allowing the executables to function properly. Reverse engineering is the practice of dissecting and/or analyzing software to understand how it works. On certain systems, reverse engineering can retrieve information stored within software such as information related to cryptographic keys or copy protection schemes. Reverse engineers can even tamper with the software itself.

Would-be attackers typically have access to the executable code for software and can try to reverse engineer it at their leisure. Those of skill in the art are aware of many approaches to harden a piece of software to such reverse engineering attempts. However, problems with these approaches include rapid growth of source code and increased computational requirements. Such source code can be very difficult to maintain. Further, if an attacker compromises the hardening scheme, the software is difficult to rewrite.

Suppose a software publisher includes proprietary keys, algorithms, and copy protection related information in software for sale. Reverse engineers can quickly obtain legitimate or illegitimate copies of the software and commence testing the software for weaknesses and thereby extract proprietary keys and algorithms. What is needed in the art is an improved way to make software more resistant to reverse engineering.

SUMMARY

Additional features and advantages of the invention are set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Disclosed herein are systems, computer-implemented methods, and non-transitory computer-readable media for obfuscating code, such as instructions and data structures. Also disclosed are non-transitory computer-readable media containing obfuscated code. In one aspect, a preprocessing tool (i.e. before compilation) identifies in a source program code a routine for replacement. The tool can be a software program running on a computer or an embedded device. The tool then selects a function equivalent to the identified routine from a pool of functions to replace the identified routine. A compiler can then compile computer instructions based on the source program code utilizing the selected function in place of the identified routine. In another aspect, the tool replaces data structures with fertilized data structures. The two approaches can be combined to fertilize both routines and data structures. These approaches can be applied to various portions of source program code based on needs for complexity, speed, or resistance to reverse-engineering attempts. A software developer can flexibly configure how and where to apply this approach to the source code. The tool can be incorporated as part of a compiler or as separate modules acting external to a compiler.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only exemplary embodiments of the invention and are not therefore to be considered to be limiting of its scope, the invention will be described and explained with additional specificity and detail through the use of the accompanying drawings in which.

DETAILED DESCRIPTION

Various embodiments of the invention are discussed in detail below. While specific implementations are discussed, this is done for illustration purposes only. A person skilled in the relevant art will recognize that other components and configurations may be used without parting from the spirit and scope of the invention.

Figure 1:
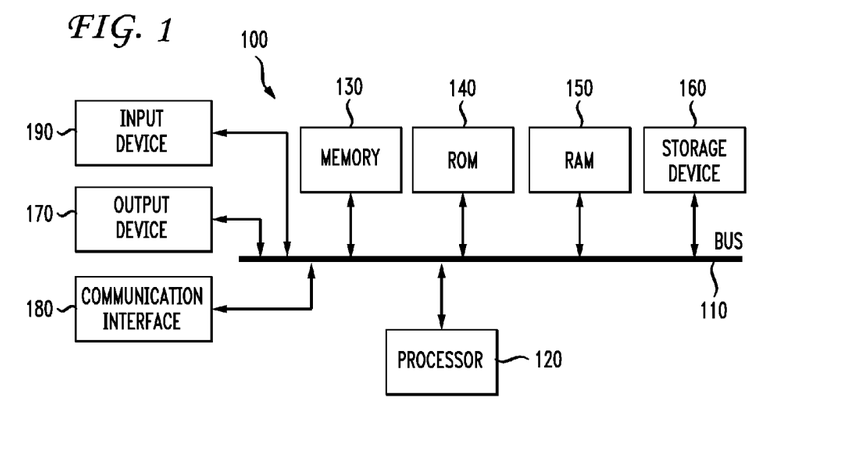
FIG. 1 illustrates an example system embodiment.

With reference to FIG. 1, an exemplary system includes a general-purpose computing device 100, with a processing unit (CPU) 120 and a system bus 110 that couples system components such as read only memory (ROM) 140, random access memory (RAM) 150, and other system memory 130 to the CPU 120. The invention may operate on a computing device with more than one core or CPU 120 or on a group of connected computing devices. A CPU 120 can include a general purpose CPU controlled by software as well as a special-purpose processor. Of course, a processing unit includes any general purpose CPU and a module configured to control the CPU as well as a special-purpose processor where software, functionality, or instructions are effectively incorporated into the actual processor design. A processing unit may essentially be a completely self-contained computing system, containing multiple cores or CPUs, a bus, memory controller, cache, etc. A multi-core processing unit may be symmetric or asymmetric.

The system bus 110 may be any of several types of bus architectures. A basic input/output (BIOS) stored in ROM 140 or the like, may provide the basic routine that helps to transfer information between elements within the computing device 100, such as during start-up. The computing device 100 further includes storage devices such as a hard disk drive 160, a magnetic disk drive, an optical disk drive, tape drive or the like. The storage device 160 is connected to the system bus 110 by a drive interface. The drives and the associated computer-readable media provide nonvolatile storage of computer-readable instructions, data structures, and other data for the computing device 100. In one aspect, a hardware module that performs a particular function includes the software component stored in a non-transitory computer-readable medium in connection with the necessary hardware components, such as the CPU, bus, display, and so forth, to carry out the function. The basic components are known to those of skill in the art and appropriate variations are contemplated depending on the type of device, such as whether the device is a small, handheld computing device, a desktop computer, or a computer server.

Although the exemplary environment described herein employs a hard disk, it should be appreciated by those skilled in the art that other types of computer-readable media which can store data that are accessible by a computer, such as flash memory cards, DVDs, random access memories (RAMs), read only memory (ROM), a cable or wireless signal containing a bit stream and the like, may also be used in the exemplary operating environment.

To enable user interaction with the computing device 100, an input device 190 represents any number of input mechanisms, such as a microphone for speech, a touch-sensitive screen for gesture or graphical input, keyboard, mouse, motion input, speech and so forth. The input may be used by the presenter to indicate the beginning of a speech search query. The device output 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on the invention operating on any particular hardware arrangement and therefore the basic features here may easily be substituted for improved hardware or firmware arrangements as they are developed.

For clarity of explanation, the illustrative system embodiment includes individual functional blocks (including functional blocks labeled as a "processor"). The functions these blocks represent may be provided through the use of either shared or dedicated hardware, including, but not limited to, hardware capable of executing software or modules configured to control the processor to perform certain steps and hardware, such as a processor, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments can include microprocessor and/or digital signal processor (DSP) hardware, read-only memory (ROM) for storing software performing the operations discussed below or controlling the processor to perform the steps, and random access memory (RAM) for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer or processor implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. Modules can include software instructions stored on a non-transitory computer-readable storage medium that provides the instructions that are executed by a computer processor.

Having disclosed some fundamental system components, the disclosure turns to a more detailed description how to obfuscate computer-executable instructions. While the figures show tools such as compilers, software in the form of source code, and method embodiments, the specific embodiments in the examples are not limiting and the principles described can be incorporated in other embodiments.

A software publisher can use a tool which generates "fertilized" or "diversified" code using a pool of equivalent routines. Equivalent routines are ones that are computationally identical. Given the same input, each equivalent routine produces the same output through different code. A pool of routines or functions can include multiple different routines that all perform the same function. Thus, in order to "fertilize" code and make it less homogenous, like instances of a particular function or routine can be replaced with different but equivalent routines. For example, one instance of the simple routine A+B can be replaced with (A−(2*B))+B+B+B in one location and A+B can be replaced with $(A^2-B^2)/(A-B)$ in another location. Other, more lengthy and complex functions can also be fertilized in this way. The pool of functions can be generated automatically and/or it can be generated manually. Further, the number of functions in the pool can expand or shrink as needed. In one aspect, each copy of a software application is fertilized randomly, such that each copy, while performing the same functions, has a different set of bits and even a different file size. In another aspect, the system selects from the pool deterministically, in a manner similar to using a seed with a random number generator, in order to reproduce the same fertilized code multiple times.

Throughout this disclosure, the words function, routine, operation, procedure, subroutine, method, statement, etc. are used to represent a segment of code. These segments of code can range from an extremely small operation to a lengthy expression potentially having thousands of lines of code or more. For example, the system can use one pool of operations to fertilize addition operations. The system can use another pool of operations to fertilize commonly used equivalents of API calls, such as strcmp( ) or memset( ) which are widely known, or other custom API calls.

In one aspect, each function in the pool of functions has substantially equivalent computational requirements. In another aspect, a developer marks each function in the pool of functions with an indicator of complexity. The developer or an automated process can also indicate a desired level of complexity for functions. One benefit of using a tool to automate such a process is that software developers can write source code using traditional, established methods without any additional thought or concern. In one aspect, the tool automatically obfuscates as a separate pass associated with compilation, leaving the original source code unobfuscated and generating obfuscated intermediate code. In this manner, the original source code remains easy to upgrade, update, comment, and otherwise maintain. Some examples of widely used equivalent basic routines and data structures are given below. The examples provided are not exhaustive and other equivalent routines and/or data structures may be freely interchanged. Code fertilization can rebuild the structure of the source code, from the unary and binary operators up to and including high level logic, by modifying the way branches and blocks are executed. Code fertilization can be applied to processes which format the operations and the sequences of instructions.

Figure 2:
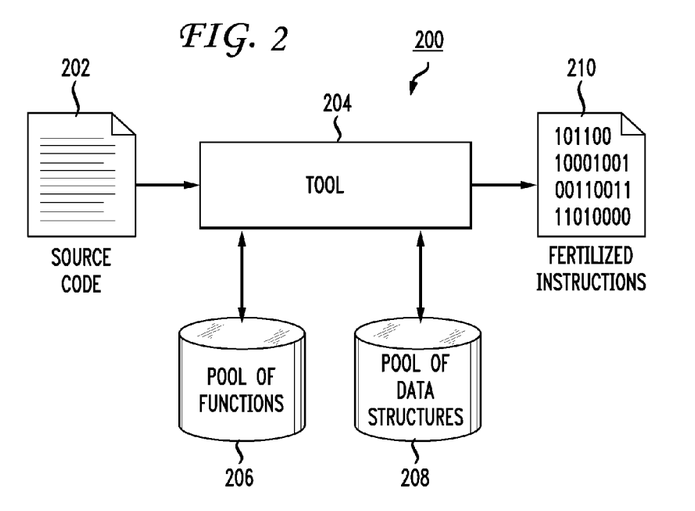
FIG. 2 illustrates an example obfuscating tool.

FIG. 2 illustrates an example system 200 based on an obfuscating preprocessor or tool 204. The tool receives source code 202 and identifies a routine or data structure in the source code for replacement. The tool 204 selects one or more equivalent functions from a pool of functions 206 to replace the identified routine and/or one or more equivalent data structures from a pool of data structures 208. The tool 204 generates fertilized instructions 210 based on the source code by replacing the identified routines and/or structures with ones from the pools 206, 208. The fertilized instructions can be in the form of fertilized source code, some intermediate, non-executable form, or computer-executable instructions. The tool 204 can obfuscate all or a subset of the routines and data structures. For example, the tool can obfuscate only critical, frequently used or rarely used code segments.

Figure 3:
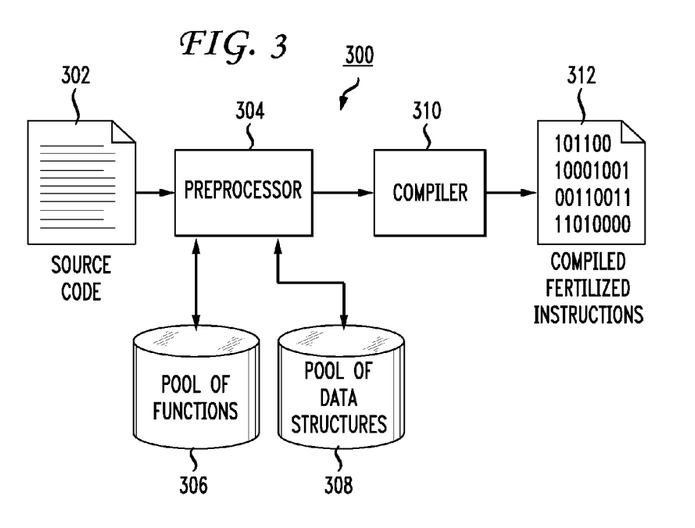
FIG. 3 illustrates an example obfuscating preprocessor and compiler.

FIG. 3 illustrates another system 300 that obfuscates source code 302 with a preprocessor 304 which selects one or more equivalent functions from a pool of functions 306 to replace the identified routine and/or one or more equivalent data structures from a pool of data structures 308. The preprocessor 304 passes obfuscated intermediate code to the compiler 310 which generates compiled instructions 312. One advantage of this approach is that any suitable commercial off-the-shelf compiler can be used without modification. Another advantage of this approach is that the preprocessor is interchangeable with other preprocessors having different performance characteristics, such as faster compile times or recursive replacement. The system can chain a series of preprocessors one after another in order to perform several fertilization passes at each preprocessor.

One example of a commonly used routine in nearly any programming language is a "for" loop. A basic understanding of the C programming language is presumed in the following discussion and pseudocode examples. In ANSI C, a "for" loop performs the same set of steps in the curly brackets starting where i equals 0 and going until i is greater than the value max, executing the function update(i) (can simply increment i, such as with i++). Such a "for" loop can be implemented as follows:

```
for (i = 0; i < max; update(i)) {
    //instructions to perform
}
```

Some equivalent yet different routines which provide the same result as the example "for" loop are given below in the following order: while loop, goto statement, recursive code, and an unrolled loop.

```
while loop:
    i = 0;
    while (i < max) {
        //instructions to perform
        update(i);
    }
```

```
goto statement:
    i = 0;
    label_for:
    if (i < max) {
        //instructions to perform
        update(i);
        goto label_for;
    }
recursive code:
    define a function : loop(i, max, update( . . . ), other_parameters);
    as:
        if (i >= max)
            return;
        else {
            //instructions to perform
            update(i);
            update_other_parameters( );
            call(loop(i; max, update( . . . ), other_parameters);
        }
(partially) unrolled loop:
    for (i = 0; i < 2 * (max /2);) {
        //first instructions to perform
        update(i);
        //second instructions to perform
        update(i);
    }
    if (max % 2) {
        //third instructions to perform
    }
```

Other equivalent routines also exist for a "for" loop. The unrolled loop, for example, can be combined with other approaches. For illustrative purposes, the loop can be split in two parts. However, the "/2" and "%2" can easily be generalized to any "/x" and "% x", as shown below:

```
for (i = 0; i < x * (max / x); ) {
    //first instructions to perform
    update(i);
    //second instructions to perform
    update(i)
    . . .
}
for (i = 0; i < max % x; i++)
    //third instructions to perform
```

Buffer copies are another slightly higher level commonly-used classical programming routine. Many alternative implementations can provide the same buffer copy functionality. For the sake of simplicity, first consider copying buffers of the same length. An external call to the C standard library function memcpy( ) can perform such a buffer copy. For security and other reasons, a software developer can provide a separate equivalent implementation of memcpy( ) (or other such standard functions) in order to avoid an external call and resist reverse engineering. In an example where A is a table of LEN elements (LEN being an integer variable) and B is the destination table, one alternative implementation of memcpy( ) is shown below as a simple loop:

```
for(i = 0; i < LEN; i++)
    B[i] = A[i];
```

This simple loop can further be recoded as shown below:

```
for(i = 0; i < LEN; i++)
    B[f(i)] = A[f(i)];
``` where f(.) is a bijective function from {0, . . . , LEN−1} to {0, . . . , LEN−1}. This results in a non-ordered copy algorithm.

One simple example for f(x) is f(x)=a.x+b mod LEN, where a and LEN are chosen coprime. In this context, mod means a modulus operation, or a remainder after a division operation. Another example is if LEN is prime, and c is coprime with Phi(LEN) and is greater than 1, where Phi(.) is the Euler totient function, then f(x)=x$^c$ mod LEN is also a valid permutation function. The Euler totient function f(x) is known to those of skill in the art and can provide the size of the multiplicative group of integers modulo x. In order to achieve a different process for each execution, the system can select a random value for a and b each time the equivalent memcpy( ) executes. The random values must still be selected within the constraint that a is coprime with LEN.

In some cases, a software developer desires to mask the length of the loop that makes the copy. This goal can be achieved by changing the loop as shown below:

```
for(i = 0; i < LEN + extra; i++)
    B[i % LEN] = A[i % LEN];
``` where extra is any integer value and may even be different at each execution. This approach can be combined with the preceding approaches. With a random ordering, some values may be rewritten. One name for this algorithm is multiple pass. With this implementation, some values are copied a first time and rewritten a second time. From a code analysis point of view or from the point of view of a would-be reverse engineer, the loop size is (LEN+extra), not LEN. The pool of functions can contain a single equivalent function of this type and generate a different value for extra at each insertion.

The equivalent version of memcpy( ) can further be hardened this way:

```
for(i = 0; i < LEN; i++) {
    randomBit = random & 0x01;
    tmp = random;
    if(randomBit == 1) {
        D[i] = tmp;
        B[i] = A[i] ^ tmp;
    } else {
        B[i] = tmp;
        D[i] = A{i % len] ^ tmp;
    }
}
for(i = 0; i < len; i++)
    B[i] ^= D[i];
    //This section can also be split in to more than two parts
```

The "^" ("exclusive or" or XOR) operation used to split the value can be changed to any other more complex operation. The algorithm can also be modified to combine the previous solution with the multiple pass, leading to split, multi-pass and de-ordered algorithms.

Switch cases are also a widely used programming technique available in many modern high-level languages. Below is an example of a switch statement:

```
switch(case) {
    case 1:
        //instructions to perform
        break;
    case 2:
        //instructions to perform
        break;
    ...
    case n:
        //instructions to perform
        break;
    default;
        //instructions to perform
}
```

A switch statement can easily be replaced by a series of conditional statements. Accordingly, the above example of a switch statement can be transformed as shown below:

```
if(case == case 1) {
    //instructions to perform
} else if(case == case 2) {
    //instructions to perform
} else if ... {
} else if(case == case n) {
    //instructions to perform
} else {
    //equivalent to default case
    //instructions to perform
}
```

Another alternative equivalent replacement for switch statements is a while loop as shown below:

```
flag = 1;
while(flag) {
    if(case == case 1) {
        //instructions to perform
        flag = 0;
    } else if(case == case 2) {
        //instructions to perform
        flag = 0;
    } else if ...{
    } else if(case == case n) {
        //instructions to perform
        flag = 0;
    } else {
        //instructions to perform
        flag = 0;
    }
}
```

Yet another alternative equivalent replacement for switch statements uses branches and goto statements, as shown below:

```
if(case == case1)
    goto case1Label;
if(case == case2)
    goto case2Label;
...
if(case == caseN)
    goto caseNLabel;
defaultLabel:
    //instructions to perform
    goto finishLabel;
case1Label:
    //instructions to perform
    goto finishLabel;
case2Label:
    //instructions to perform
    goto finishLabel;
...
caseNLabel:
    //instructions to perform
    goto finishLabel;
finishLabel:
```

In some situations, switch statements are not only used to choose a process, but to choose a value, as shown in the example below:

```
switch(case) {
    case1:
        tmp = 1;
        break;
    case2:
        tmp = 2;
        break;
    case3:
        tmp = 3;
        break;
    default:
        break;
}
f(tmp, ...);
``` where f( . . . ) is a given function using tmp:

```
tmp = (case == case1 || case == case2 || case == case3) *
    [(case == case1) + 2 * (case == case2) + 3 * (case == case3)];
f(tmp, ...);
```

This example includes some basic arithmetic, but more evolved and complex operations can mix boolean and arithmetic operators. For purposes of clarity, this example uses only very basic fixed values of 1, 2 and 3, but any value can be assigned to tmp. In this example, the default case does not assign any value to tmp, but the default case can include instructions which, for example, assign tmp a default value. For example, a switch statement can be split into a series of smaller switch statements each fertilized in a different way, but the collection of which accomplishes the same end result as the original switch statement.

When implementing algorithms, arithmetic and boolean operations are frequently used. Various non-exhaustive implementation examples are given below. A classical implementation of adding two bytes_op1 and _op2 is generally represented by_op1+_op2. One possible way to "fertilize" the addition operation is to use equivalent variations such as plus8(_op1, _op2) as defined below. Similar approaches can cover all the basic arithmetic and boolean operations.

Below are some illustrative implementations, but other optimizations and variations of these algorithms are possible. The algorithms are presented in pseudo code, but generally conform to ANSI C and may be implemented in any suitable programming language.

| Addition of integers: |
|---|
| byte plus8(byte op1, byte op2) {<br>    byte result = 0, _op1, _op2;<br>    bool c = true;<br>    for (unsigned int i = 0; i < 8; i++) {<br>        op1 = _op1;<br>        op2 = _op2;<br>        op1 >>= i;<br>        op2 >>= i;<br>        op1 &= 0x01;<br>        op2 &= 0x01;<br>        if ((op1 == 1) && (op2 == 1)) {<br>            op1 = (c == false) ? 1 : 0;<br>            c = false;<br>        } else if ((op1 == 0) && (op2 == 0)) {<br>            op1 = (c == false) ? 1 : 0;<br>            c = true;<br>        } else { |

| Addition of integers: |
|---|
|             op1 = (c == false) ? 0 : 1;<br>        }<br>        op1 <<= i;<br>        result |= op1;<br>    }<br>    return result;<br>} |

If the 8-bit bytes of the above example are replaced by a 32-bit word, 16-bit word or anything else, the system can change the length of the loops to match the number of bits used to represent the inputs. Below is an example algorithm for subtracting integers which may be included in a pool of unsigned integer subtraction functions.

| Subtraction of integers: |
|---|
| byte sub8(UInt8 _op1, UInt8 _op2) {<br>    byte result = 0, op1, op2, r = 1;<br>    for (unsigned int i = 0; i < 8; i++) {<br>        op1 = _op1;<br>        op2 = _op2;<br>        op1 >>= i;<br>        op2 >>= i;<br>        op1 &= 0x01;<br>        op2 &= 0x01;<br>        if ((op1 == 1) && (op2 == 0)) {<br>            op1 = (r == 0) ? 0 : 1;<br>            r = 1;<br>        } else if ((op1 == 0) && (op2 = 1)) {<br>            op1 = (r == 0) ? 0 : 1;<br>            r = 0x80;<br>        } else {<br>            op1 = (r == 0) ? 1 : 0;<br>        }<br>        op1 <<= i;<br>        result |= op1;<br>    }<br>    return result;<br>} |

As previously explained, byte types can be changed to accommodate data of any length, such as words, double words, longs, etc. These different data lengths can lead to numerous different equivalent routines. Loops lengths can also be adapted to suit different lengths of data. One of skill in the art will recognize how to generalize and extend these examples to accommodate other types and sizes of input. Below are provided some non-limiting examples of how to extend these principles to logical operations such as OR, AND, and XOR.

| Logical exclusive OR (XOR): |
|---|
| byte xor8(byte op1, byte op2) {<br>    byte result, c;<br>    result = plus8(op1, op2);<br>    c = and8(op1, op2);<br>    c <<= 1;<br>    result = sub8(result, c);<br>    return result;<br>} |

| Logical exclusive AND: |
|---|
| byte and 8(byte_op1, byte_op2) {<br>    byte result = 0, op1, op2;<br>    for(unsigned int i = 0; i < 8; i++) {<br>        op1 = _op1; |

-continued

```
            op2 = _op2;
            op1 <<= i;
            op2 <<= i;
            op1 &= 0x80;
            op2 &= 0x80;
            op1 &= op2;
            op1 >>= opi;
            result |= op1;
        }
        return result;
    }
```

Logical exclusive OR:

```
    byte or8(byte _op1, byte _op2) {
        byte result = 0, op1, op2;
        for unsigned int i = 0; i < 8; i++) {
            op1 = _op1;
            op2 = _op2;
            op1 <<= i;
            op2 <<= i;
            op1 &= 0x80;
            op2 &= 0x80;
            op1 |= op2;
            op1 >>= i;
            result = plus8(result, op1);
        }
        return result;
    }
```

Multiplication of Integers:

```
    byte mul8(byte _op1, byte _op2) {
        byte result = 0, op1, op2, mask;
        for (unsigned int i = 0; i < 8; i++){
            op1 = _op1;
            op2 = _op2;
            mask = 0;
            op2 >>= i;
            op2 &= 0x01;
            for(unsigned int j = 0; j < 8; j++) {
                mask |= (op2 << j);
            }
            op1 <<= i;
            op1 = and8(op1, mask);
            result = plus8(op1, result);
        }
        return result;
    }
```

Upon close examination, operations on bytes are collections of basic operations performed on bits within the bytes. This approach can also be generalized by using operations on bytes when implementing operations on larger data types. For example, a 32-bit integer can be viewed as a set of four 8-bit blocks. The following example is one implementation for adding 32-bit words:

```
    word32 plus32(word32 _op1, word32 _op2) {
        word32 result = 0;
        word32 op1, op2, tmp, c = 0;
        for(unsigned int i = 0; i < 8; i++) {
            op1 = (_op1 >> (4 * i)) & 0x0F;
            op2 = (_op2 >> (4 * i)) & 0x0F;
            tmp = plus8(op1, c);
            tmp = plus8(tmp, op2);
            result >>= 4;
            result |= (tmp & 0x0F);
            c = tmp >> 4;
        }
        return result;
    }
```

In order to illustrate just one of the plentiful number of possibilities to design equivalent replacement algorithms, the previous algorithm can be recoded as follows:

```
    word32 plus32(word32 _op1, word32 _op2) {
        word32 result = 0, op1L = _op1, op2L = _op2;
        byte op1, op2, i, tmp, c = 0;
        for(i = 0; i < 8; i++) {
            op1 = op1L & 0x0F;
            op2 = op2L & 0x0F;
            tmp = plus8(op1, c);
            tmp = plus8(tmp, op2);
            result <<= 4;
            result |= (tmp & 0x0F);
            c = tmp >> 4;
            op1L >>= 4;
            op2L >>= 4;
        }
        return result;
    }
```

In addition to the executable routine fertilization techniques described above, the system can also fertilize data structures. For instance, when working with two completely separate instances of the same structure in memory, the system can redefine custom fields in memory so the accesses are different for both parts. An attacker will encounter great difficulty because he cannot easily figure out that both fields refer to the same structures. Accesses (read and/or write operations) should be defined for each element of the structure. If the source code does not require interaction between fertilized structures, then "interaction operations" between the structures may not be needed. For example, the simple original data structure shown below can be referenced by the more complex fertilized data structure, also shown below:

```
Original data structure:
    struct exStruct {
        UInt8     firstName[FIRST_NAME_LEN];
        UInt8     lastName[LAST_NAME_LEN];
        UInt32    number;
        UInt8     address[MAX_ADDRESS_LEN];
        UInt32    zipCode;
    } _exStruct;
Fertilized data structure:
    struct exStruct_Fert1 {
        UInt16    number_part1;
        UInt8     zipCode_part2;
        UInt8     firstName[FIRST_NAME_LEN /4];
        UInt8     zipCode_part4;
        UInt8     lastName_part1 [(LAST_NAME_LEN /4) /2];
        UInt8     zipCode_part3;
        UInt32    address[MAX_ADDRESS_LEN / 4];
        UInt8     zipCode_part1;
        UInt16    number_part2;
        UInt8     lastName_part2[(LAST_NAME_LEN /4) /2];
    } _exStruct_Fert1;
```

For each field of the structure, the system can specify the way to perform basic read and write operations. The system can handle conversions from the original structure to one of various fertilized structures. This example is only a simple illustration. Other more complex and varied fertilizations of structures are possible and may even be desirable. In this example, the UInt32 values for "number" are decomposed in two UInt16 values, "number_part1" and "number_part2". The decomposition could have been done on four UInt8's, or two UInt8's and one UInt16, for example. In another example, the system represents a UInt (one, two, or four byte long memory slots) on a larger memory container such as an array.

When writing the original source code, a programmer can reference the original structure exStruct. The system can use a tool to fertilize the exStruct into exStruct_Fertl, as one example. The system applies this tool before compile time. In one aspect, the tool fertilizes different portions of the code at different times. This tool can also change the API of the functions as explained below.

Basic operations such as addition, multiplication, subtraction, and so forth are illustrated through the above provided set of non-exhaustive examples. Higher level routines, i.e. logical functions, can also be inlined and can be represented in various different ways as well. This approach can be especially convenient for API calls which are repeatedly called or potentially predictable, such as block copies, comparisons, tests, etc. These types of API calls are potentially susceptible to fingerprinting by an attacker, for instance, using measures between binary instructions.

The system can easily fertilize API calls. Then, the system or programmers can generate several different implementations of the API to be fertilized. All or part of the API can be fertilized. The different fertilized implementations can be something as simple as changing the order of instructions or something more complex such as refactoring the algorithm underlying the approach. In one aspect, a fertilized API can be implemented in a different language. Each of the various implementations can include ratings for security, performance, complexity, and/or other features. This way, the system can replace the original API call with a fertilized one of equivalent performance characteristics or of a desired level of complexity. The system's pool of functions can include as many functions as needed and can even include a module to generate new equivalent functions or modify existing ones. The tool can randomly choose one of the functions having the corresponding properties according to performance needs as it parses the original source code.

A relevant non-exhaustive example is a custom inlined memory compare routine. The system can fertilize the memory compare routine. Because the program does not call the same memory compare routine each time it requires that functionality, a possible attacker is unable to fingerprint external and standard memcmp( ) calls as part of the libc library, for example. Shown below is an example fertilized routine that compares two memory ranges and returns NO_ERROR if the comparison matches.

```
status UnsignedbyteArrayCmp( UInt8* _array1, UInt8* _array2,
 UInt32 _length) {
     /* _array1: Input, the first string to compare */
     /* _array2: Input, the first string to compare */
     /* _length: Input, the length of the array */
     /* NO_ERROR (0) if the compare is okay */
     f_status return_code = NO_ERROR;
     UInt8 left, right;
     UInt32 i, j, random;
     for (i = 0; i < _length; i++ ) {
         for (j = 0; j < 8; j++) {
             left = *( _array1 + i)
             random = generateRandom( );
             relaxLocal( random );
             left <<= j;
             left &= 0x80;
             right = *( _array2 + i);
             right <<= j;
             right &= 0x80;
             if ( left != right) {
                 random = generateRandom( );
                 relaxLocal( random );
                 return_code = ERROR;
             } else {
                 random = generateRandom( );
```

-continued

```
                 relaxLocal( random );
             }
         }
     }
     return return_code;
}
```

Figure 5:
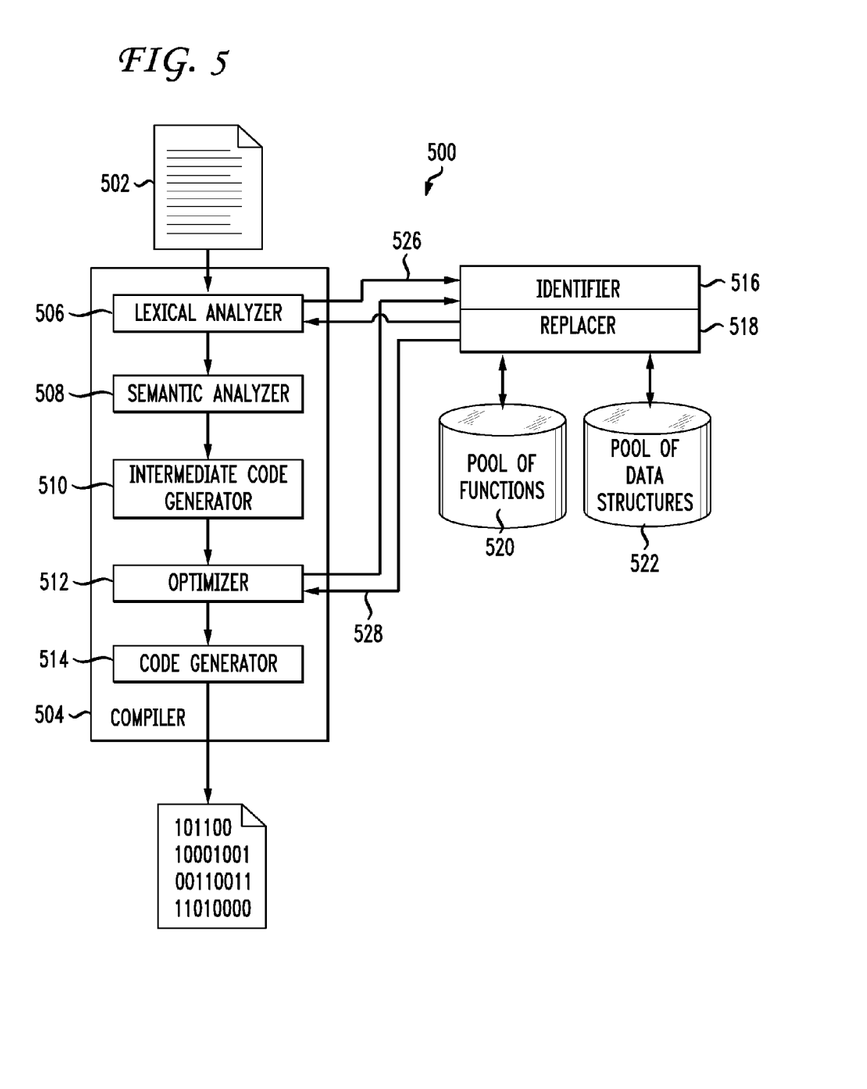
FIG. 5 illustrates a detailed view of an obfuscating compiler.

Next the disclosure turns to the tool and provides more details about the tool and how it operates during pre-processing and before compilation time. The tool can be software, modules configured to control a processor, a special-purpose processor, or any combination of the above to perform certain functional steps. In the description of most of the solutions, the tool performs operations before compilation in order to transform the source code. However, these descriptions are for illustration purposes and should not be considered limiting. The tool can perform all or part of the described operations at any stage before compilation. FIG. 5 illustrates a detailed view 500 of an example obfuscating compiler 504. A compiler can include a subset of the shown components as well as additional components. The compiler 504 receives source code 502. The compiler 502 typically passes source code 502 through a lexical analyzer 506, a semantic analyzer 508, an intermediate code generator 510, an optimizer 512, and a code generator 514 to generate obfuscated compiled code. An identifier 516 and replacer 518 can operate at any stage before, during, and/or after compilation, from the source code up to and including the compiled code. The replacer 518 replaces routines or data structures in the source code with equivalent ones from a pool of functions 520 or pool of data structures 522. In one variation, the identifier 516 and replacer 518 act at the lexical analyzer 506 stage 526. In another variation, the identifier 516 and replacer 518 act at the optimizer 512 stage 528.

For illustrative purposes, several specific implementations of basic, widely-used operations are provided. Other implementations are anticipated and desirable in order to provide as much variety and unpredictability as possible when replacing operations from the pool in order to frustrate reverse engineering attempts. In one example, the tool accepts the original source code and a set S of equivalent routines as input. The tool generates as output fertilized source code with equivalent behaviors but different processes. For all routines marked for fertilization, the tool first picks a number R derived from a seed or randomly. The tool selects a routine in the set of equivalent routines using the random number R. The tool can select a routine in the set of equivalent routines based on complexity and/or performance. The tool then replaces the routine with the selected equivalent routine. The tool can operate at one or more different levels such as original C source code, JAVA source code representation, CPU-specific assembly code, or any virtual machine representation.

In one embodiment, the developer marks sections of code for fertilization including a certain level of security according to the criticality of the changed instructions and performance or other characteristics. Certain fertilized routines can be intentionally hardened against likely attack vectors or for specific performance benefits or advantages. Instead of one large pool of equivalent functions, the tool can build assorted sets of different equivalent functions according to their defined security level and/or performance requirements. For example, one computer software application requires 3 security levels L1, L2, and L3. Given a function F and a set of equivalent functions $\{f_i\}_i$, the system decomposes the set $\{f_i\}_i$ according to security level into {f1$_j$}$_i$ for security level L1, {f2$_j$}$_i$ for security level L2, and {f3$_j$}$_i$ for security level L3.

Figure 4:
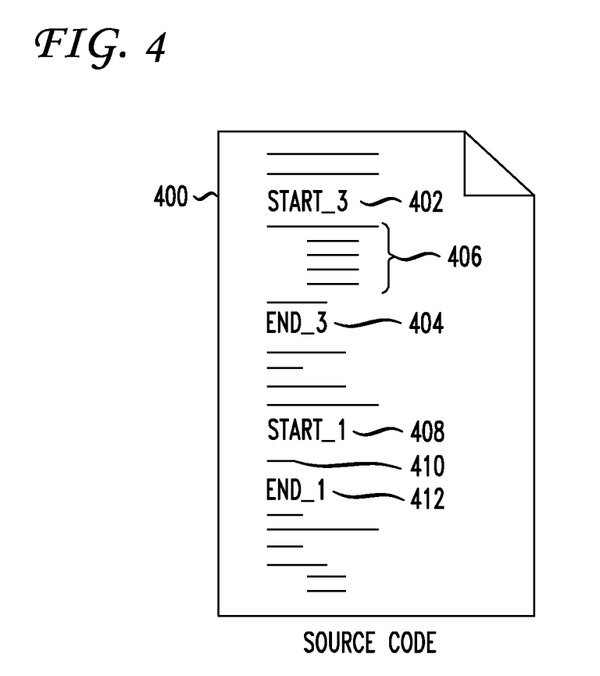
FIG. 4 illustrates source code which includes comments.

Comments in the original source code can include information indicating to which pool the function belongs. These comments can function as markers. FIG. 4 illustrates source code 400 which includes comments. A start 402 and end 404 comment can mark a section 406 of code consisting of many lines. Different start 408 and end 412 comments can mark a specific line of code 410, such as a declaration of or a reference to a data structure for obfuscation or a single-line call to a complex underlying function. A programmer and/or an automated precompiler can insert fertilization comments directly in the original source code in the form of special cases of standard comments which a compiler ignores. For instance, in C source code comments can be inserted between "/*" and "*/". In Lisp source code comments can be inserted between "#|" and "|#". In some situations, fertilization comments include a magic word, key word, or other flag, one example of which is shown below:

```
/* FERTILIZE: L2 */
    UInt32 function (UInt32 arg1, UInt16 arg2, UInt8 *arg3) {
    (...)
    a = b + c;
    (...)
    return rc;
}
```

In one extended variation, fertilization comments include a start tag and an end tag to define an area within which all the operations are fertilized, such as the following example:

```
/* FERTILIZE_START: L3 */
    (...)
/* FERTILIZE_END */
```

The same comment form can also mark data structure fertilization as well as routine fertilization. However, markers are not limited to code comments and may take other forms. Markers can indicate a desired level of security, performance, complexity, or other attribute.

When the tool encounters fertilization comments, the tool can fertilize the entire indicated source code block, replacing basic operations, higher level routines, and/or data structures. A code block can be part of a function, a loop, an entire function, etc. In one implementation, the larger scope of a fertilization comment is a function block but the granularity is not restrictive and could be different according to the implementation. The examples provided herein are non-exhaustive and many other equivalent examples of programming techniques are within the scope and spirit of the disclosure.

The described tools and source code can be written in any suitable computer programming language, such as C, Java, Perl, Pascal, etc. The tool can be directly integrated into a compiler, implemented as a plug-in for optional integration within an existing compiler, or implemented as a standalone module. The approaches and tools described herein are applicable to compiled, interpreted, just-in-time (JIT) compiled, and other types of computer code. In one embodiment, the obfuscated instructions are executed immediately preceding runtime of the compiled instructions. The approaches herein can be advantageously combined with other obfuscation and/or code hardening techniques to hinder both static and dynamic reverse engineering attempts.

Figure 6:
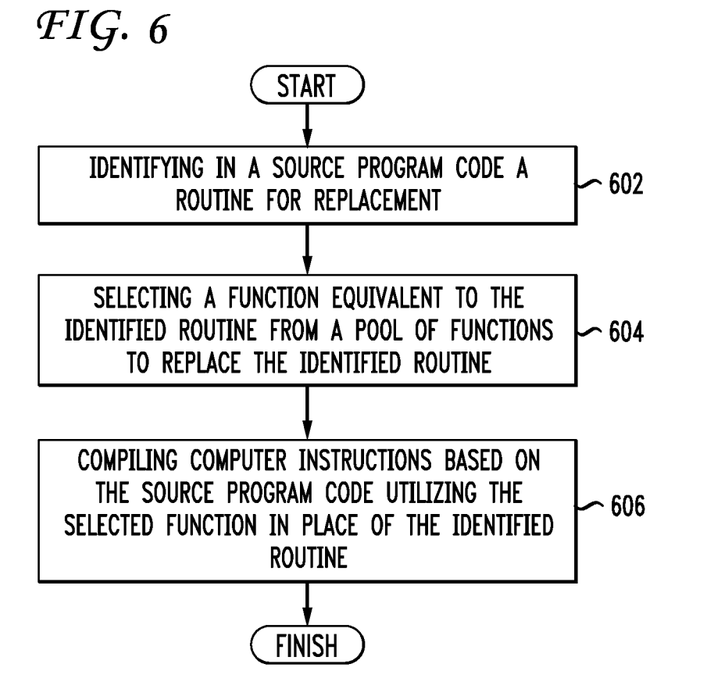
FIG. 6 illustrates an example method embodiment for obfuscating routines.

FIG. 6 illustrates an example computer-implemented or device-implemented method embodiment for obfuscating routines. The method first identifies in a source program code a routine for replacement (602). The method then selects a function equivalent to the identified routine from a pool of functions to replace the identified routine (604). Next the method compiles computer instructions based on the source program code utilizing the selected function in place of the identified function or routine (606).

Figure 7:
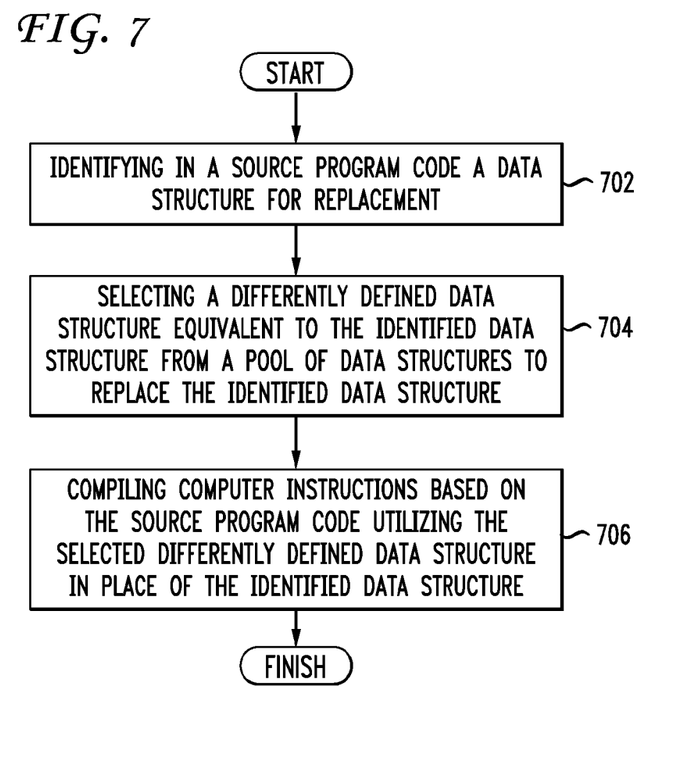
FIG. 7 illustrates an example method embodiment for obfuscating data structures.

FIG. 7 illustrates an example computer-implemented or device-implemented method embodiment for obfuscating data structures. First the method identifies in a source program code a data structure for replacement (702). The method selects a differently defined data structure equivalent to the identified data structure from a pool of data structures to replace the identified data structure (704). The method then compiles computer instructions based on the source program code utilizing the selected differently defined data structure in place of the identified data structure (706).

Embodiments within the scope of the present invention may also include tangible and/or non-transitory computer-readable media for carrying or having computer-executable instructions or data structures stored thereon. Such computer-readable media can be any available media that can be accessed by a general purpose or special purpose computer, including the functional design of any special purpose processor as discussed above. Some non-limiting examples of such non-transitory computer-readable media are RAM, ROM, EEPROM, CD-ROM or other optical disk storage, magnetic disk storage or other magnetic storage devices, or any other storage medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Combinations of the above are also within the scope of the computer-readable media.

Computer-executable instructions include, for example, instructions and data which cause a general purpose or special purpose processing device to perform a certain function. Computer-executable instructions also include program modules that are executed by computers in stand-alone or network environments. Generally, program modules include routines, programs, data structures, objects, components, and the functions inherent in the design of special-purpose processors that perform particular tasks or implement particular abstract data types. Computer-executable instructions, associated data structures, and program modules represent examples of the program code means for executing any or all of the steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the invention. For example, the principles herein may be applied equally to precompiled code, differently for each generated copy of compiled code, on-the-fly as a program is installed, and so forth. Those skilled in the art will readily recognize various modifications and changes that may be made to the present invention without following the example embodiments and applications illustrated and described herein, and without departing from the true spirit and scope of the present invention.

We claim:

1. A system comprising:
    a processor;
    a first module configured to control the processor to identify in a program a data structure for replacement, wherein the program includes an instance of the data structure, the data structure supporting at least read and write operations to store and organize data;
    a second module configured to control the processor to replace the instance of the data structure, the replacing comprising:
    selecting a replacement data structure from a pool of data structures semantically equivalent to the identified data structure, wherein each semantically equivalent data structure can store and organize the data using a unique organizational structure different than the identified data structure and different than each other semantically equivalent data structure, and
    utilizing the replacement data structure in place of the identified data structure for the instance, wherein the replacement data structure includes a different number of fields than the identified data structure.

2. The system of claim 1, wherein the different number of fields in the replacement data structure are created by splitting at least one field in the identified data structure into a plurality of fields in the replacement data structure.

3. The system of claim 1, wherein a type of at least one field in the identified data structure is changed to generate the replacement data structure.

4. The system of claim 3, wherein the type of the at least one field in the replacement data structure requires a larger memory container.

5. The system of claim 1, wherein the program contains at least one marker added by a developer indicating a data structure to replace.

6. The system of claim 5, wherein the at least one marker further indicates a security level.

7. A method for obfuscating a program, the method comprising:
    receiving source code via a processor, the source code including a plurality of instances of a data structure for replacement, the data structure supporting at least read and write operations to store and organize data;
    selecting a subset of instances from the plurality of instances, and for each instance in the subset of instances, replacing the instance of the data structure, wherein replacing an instance of the data structure comprises:
    selecting a replacement data structure from a pool of data structures semantically equivalent to the identified data structure, wherein each semantically equivalent data structure can store and organize the data using a unique organizational structure different than the identified data structure and different than each other semantically equivalent data structure, and
    utilizing the replacement data structure in place of the identified data structure for the instance, wherein the replacement data structure includes a different number of fields than the identified data structure; and
    generating an obfuscated program.

8. The method of claim 7, wherein the source code contains at least one marker added by a developer indicating a data structure to replace.

9. The method of claim 7, wherein replacing the data structure includes inserting the replacement data structure in the program and removing the identified data structure from the program.

10. The method of claim 9, wherein removing the identified data structure occurs in response to replacing all instances of the identified data structure.

11. The method of claim 7, wherein each data structure from the pool of data structures is associated with performance characteristics.

12. The method of claim 11, wherein the performance characteristics are at least one of a security rating, a performance rating, or a complexity rating.

13. The method of claim 11, wherein selecting the data structure from the pool of data structures is based on the associated performance characteristics.

14. A non-transitory computer-readable storage medium storing instructions for controlling a computing device to perform steps comprising:
    identifying in a program a data structure for replacement, the program including a first instance of the data structure and a second instance of the data structure, and wherein the data structure supports at least read and write operations to store and organize data;
    selecting a first replacement data structure from a pool of data structures semantically equivalent to the identified data structure, wherein each semantically equivalent data structure can store and organize the data using a unique organizational structure different than the identified data structure and different than each other semantically equivalent data structure; and
    replacing the first instance of the identified data structure with the first replacement data structure, wherein the replacement data structure includes a different number of fields than the identified data structure.

15. The non-transitory computer-readable storage medium of claim 14, the steps further comprising:
    selecting a second replacement data structure from the pool of data structures; and
    replacing the second instance of the identified data structure with the second replacement data structure.

16. The non-transitory computer-readable storage medium of claim 15, wherein the first replacement data structure and the second replacement data structure are different data structures.

17. The non-transitory computer-readable storage medium of claim 14, wherein each data structure in the pool of data structures has an associated level of complexity and the first replacement data structure is selected from the pool of data structures based on a specified desired level of complexity.

18. The non-transitory computer-readable storage medium of claim 14, wherein a number of fields in the identified data structure differs from a number of fields in the first replacement data structure.

19. The non-transitory computer-readable storage medium of claim 14, wherein a type of at least one field in the identified data structure is changed to generate the first replacement data structure.

* * * * *